United States Patent [19]

Schoenberg et al.

[11] 3,860,582

[45] Jan. 14, 1975

[54] DERIVATIVES OF 4-CHLORO-5-SULFAMOYL-ANTHRANILIC ACID

[75] Inventors: Shlomo Schoenberg, Jerusalem; Haim Yellin, Ramat Gan, both of Israel

[73] Assignee: Teva Middle East Pharmaceutical & Chemical Works Ltd., Jerusalem, Israel

[22] Filed: July 12, 1972

[21] Appl. No.: 271,314

[30] Foreign Application Priority Data

July 20, 1971  Israel.................................. 37345
Feb. 22, 1972  Israel.................................. 38812

[52] U.S. Cl.......... 260/239.6, 260/239.9, 260/397.7, 424/228, 424/229
[51] Int. Cl..................... C07d 5/16, A61k 27/00
[58] Field of Search........... 260/239.6, 239.9, 397.7, 260/609 R

[56] References Cited
UNITED STATES PATENTS

| | | | |
|---|---|---|---|
| 2,908,716 | 10/1959 | Cisney et al. ...................... | 260/609 |
| 3,565,920 | 2/1971 | Werner et al. .................... | 260/347.2 |
| 3,567,714 | 3/1971 | Wilson ............................. | 260/239.6 |
| 3,678,039 | 7/1972 | Werner et al. .................... | 260/239.6 |

FOREIGN PATENTS OR APPLICATIONS

| | | | |
|---|---|---|---|
| 965,089 | 7/1964 | Great Britain .................. | 260/239.6 |

OTHER PUBLICATIONS

Muller, Methoden der Organischen Chemie (Thieme, Stuttgart, 1954) pp. 481–482.

Theilheimer (Ed.), Syn. Meth. in Org. Chem., Vol. 19, (Karger, New York, 1965), No. 440 at p. 190.

Theilheimer (Ed.) Syn. Meth. in Org. Chem., Vol. 17, (Karger, N.Y., 1963), No. 294 at p. 121.

*Primary Examiner*—Henry R. Jiles
*Assistant Examiner*—C. M. S. Jaisle
*Attorney, Agent, or Firm*—Ladas, Parry, VonGehr, Goldsmith & Deschamps

[57] ABSTRACT

New derivatives of 4-chloro-5-sulfamoyl-anthranilic acid. In the new derivatives the 5-sulfamoyl group is substituted by $R_1XCH_2$, where X is oxygen or sulfur and $R_1$ is a straight or branched-chain lower alkyl radical of up to 10 carbon atoms which may be substituted by a hydroxy or alkoxy group or several such groups, a cycloalkyl radical, an alkenyl or alkinyl radical, an aralkyl or heteroarylalkyl radical. The novel compounds are valuable diuretics and saluretics and they are prepared from corresponding free sulfamoyl compounds by reaction with formaldehyde or paraformaldehyde and a compound $R_1$—XH where $R_1$ and X have the same meaning as above.

26 Claims, No Drawings

DERIVATIVES OF 4-CHLORO-5-SULFAMOYL-ANTHRANILIC ACID

This invention concerns new N,N'-disubstituted derivatives of 4-chloro-5-sulfamoyl-anthranilic acid and salts of such derivatives, having valuable therapeutic properties. The invention also provides novel processes for preparing these new compounds.

It is known that compounds having the formula

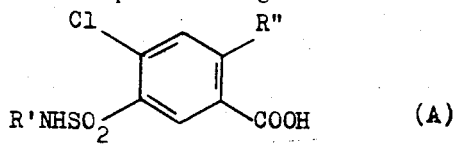

(A)

in which R' is hydrogen alkyl, aralkyl or alkoxy, and R" is furfurylamino and may also be benzylamino, dibenzylamino, pyrrolylethylamino or thenylamino when R' is H, possess diuretic and saluretic activity. For example, the compound of formula (A) in which R' is hydrogen and R" is furfurylamino is known as "Fursemide" or "Furosemide" and is widely used as a potent diuretic. However, the compounds of formula (A), including Furosemide, exhibit a certain toxicity.

It has now unexpectedly been found, according to the present invention, that compounds of the general formula

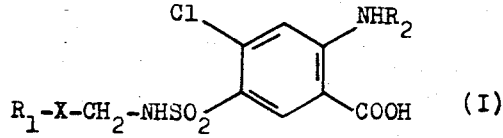

(I)

in which X is oxygen or sulfur, $R_1$ is a straight or branched-chain lower alkyl radical of up to 10 carbon atoms, which may be substituted by a hydroxy or lower alkoxy group or several such groups, a cycloalkyl radical, an alkenyl or alkinyl radical, an aralkyl or heteroaryl-alkyl radical, and $R_2$ is a straight or branched-chain lower alkyl radical containing up to 4 carbon atoms, a benzyl, phenetyl, furfuryl, thenyl, pyrrolylethyl or cyclohexyl radical, and physiologically acceptable metal and ammonium salts thereof, exhibit diuretic and saluretic activities which are at least as high as those of the known compounds of formula (A), while being less toxic.

Within the above general group the invention thus provides two sub-groups of compounds of the following formulae

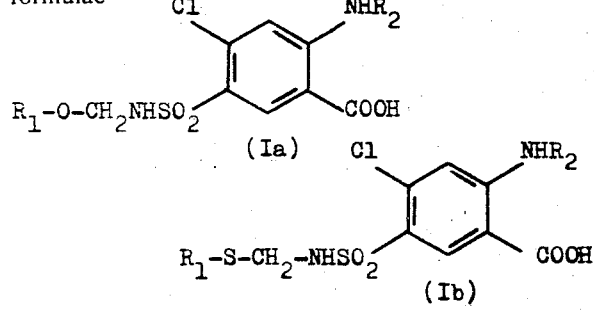

In these formulae $R_1$ and $R_2$ have the same meanings as above.

The new compounds of formula I can be produced by a novel process according to the invention, wherein a compound of the general formula

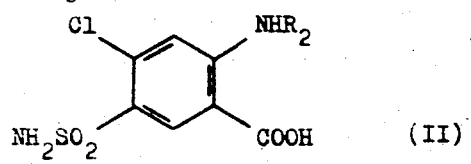

(II)

or an alkali metal salt thereof, is reacted with a formaldehyde solution or with paraformaldehyde and with a compound of the general formula $$R_1 - XH$$

(III)

In formulae II and III, $R_1$, $R_2$ and X have the same meaning as in formula I above.

An acid of formula I obtained as described above may, if desired, be converted into a physiologically acceptable metal or ammonium salt. Where an alkali salt of the acid of formula II is used as starting material and the reaction is so conducted that the product of formula I is a salt of the same alkali metal, such a salt may, if desired, be converted into the free acid or a different physiologically acceptable salt, by methods known per se.

The reaction may be carried out either at room temperature or at elevated temperatures, preferably below 100°C, and is preferably performed in a suitable solvent.

The reaction may be carried out under mild acidic or alkaline conditions at a pH not exceeding about 10. Where desired, a mild alkaline pH within the range of from about 7 to about 10 may be established by the addition of an alkali metal bicarbonate.

The starting materials of formula II are either known or can be prepared by known methods, e.g. by the reaction of 3-sulfamoyl-4-chloro-6-halobenzoic acid with an amine $R_2NH_2$ For the preparation of a compound of formula Ia, the starting material of formula II or an alkali metal salt thereof is reacted with a formaldehyde solution or with paraformaldehyde, and an alcohol of the formula $$R_1OH \quad (6)$$

(IIIa)

This reaction proceeds according to the following scheme:

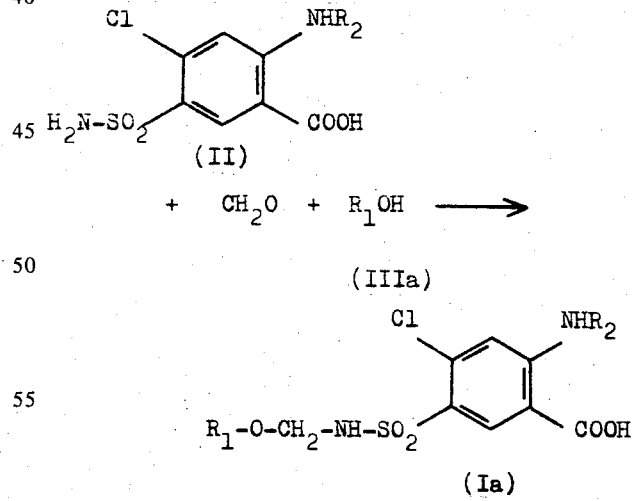

If desired, an excess of the alcohol $R_1OH$ or a mixture thereof with water may be used as solvent.

In the above formulae Ia, II and IIIa, $R_1$ and $R_2$ have the same meanings as in formula I above.

Some of the novel compounds of formula Ia are best accessible from another compound of that formula by exchange of the radical $R_1$. For this purpose a compound of formula Ic below in which $R_1'$ is defined as $R_1$ in formula I, is dissolved in an excess of an alcohol of the formula.

$R_1OH$ (IIIa)

in which $R_1$ has the same meaning as in formula I above but is other than $R_1'$ in formula Ic, and the solution is preferably heated. This process can be represented by the following reaction scheme:

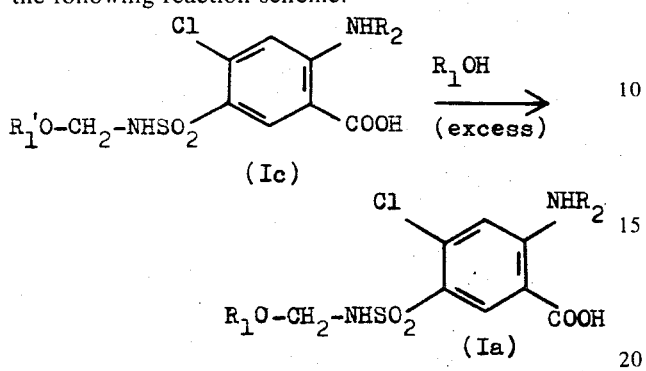

For the preparation of a compound of formula Ib the starting material of formula II or an alkali metal salt thereof, is reacted with a formaldehyde solution or paraformaldehyde and a mercaptan of formula $$R_1 SH \quad (IIIb)$$

in the presence of a lower alkyl alcohol, e.g. methanol. This reaction is believed to proceed according to the following scheme:

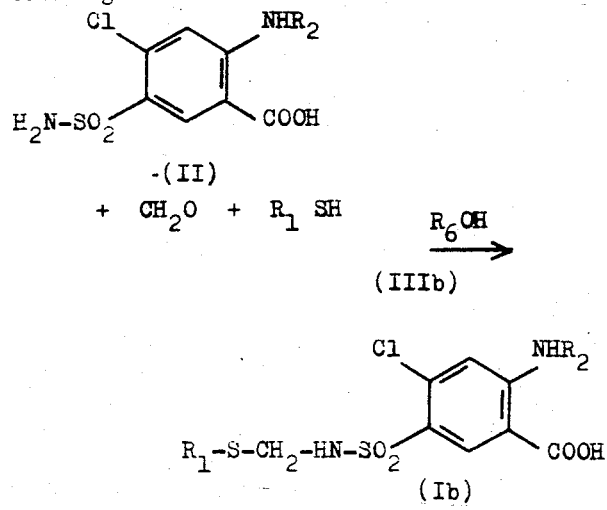

It is further believed that in the above reaction there occurs the intermediary formation of a compound of the general formula

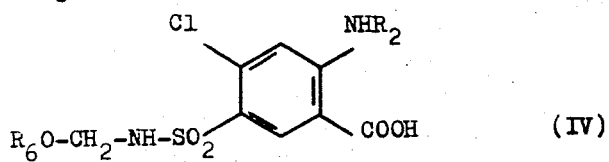

which then reacts with the mercaptan $R_1$ SH.

In the above formulae Ia, II, IIIb and IV, $R_1$ and $R_2$ have the same meanings as in formula I above, and $R_6$ is lower alkyl.

A compound of formula Ib can also be prepared by reacting a compound of formula Id with a mercaptan of formula IIIb, preferably at elevated temperature. Such a conversion proceeds according to the following scheme:

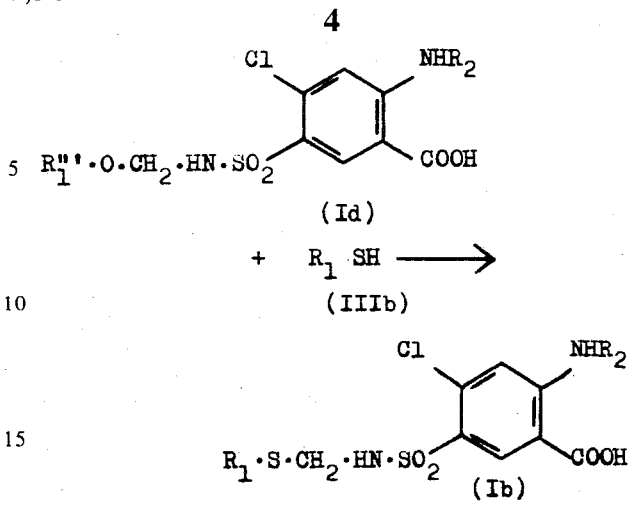

In the above formulae Ib, Id and IIIb, $R_1$ and $R_2$ have the same meaning as in formula I above, and $R_1'''$ is defined the same way as $R_1$ in formula I, and $R_1$ and $R_1'''$ may be the same or different.

As stated above, the new compounds of formula I are suitable as diuretic and saluretic agents, and in consequence are particularly useful for the clinical treatment of edemas. They can be administered in dosages within the range of 10 to 500 mg.

Preliminary studies in rats with some compounds of the invention have shown them to be superior or equipotent to Furosemide in diuretic activity and considerably less toxic per os. Thus, the oral $LD_{50}$ in rats was found to be:

N-Furfuryl-4-chloro-5-(ethoxymethyl-sulfamoyl)-anthranilic acid — 6.4 g/kg body weight
N-Furfuryl-4-chloro-5-(methoxymethyl-sulfamoyl)-anthranilic acid — 8.9 g/kg body weight
N-Furfuryl-4-chloro-5-(butoxymethyl)-sulfamoyl)-anthranilic acid — 9.8 g/kg body weight.

Against this the $LD_{50}$ of Furosemide is 4 g/kg body weight.

Electrolyte studies in rats for 5 hours excretion upon oral administration of 50 mg/kg body weight carried out with some compounds of the invention have shown a more favourable Na/K ratio than Furosemide. Thus N-furfuryl-4-chloro-5-(pentoxymethyl-sulfamoyl)-anthranilic acid exhibited a ratio of 5.7 compared with 4.0 for Furosemide.

Comparison of the acute and subchronic diuretic effects of N-furfuryl-4-chloro-5-(butoxymethyl-sulfamoyl)-anthranilic acid with those of Furosemide, showed that they are of substantially equal potency. Moreover, daily administration to rats of the above mentioned compound according to the invention, for 21 days, did not result in any observable toxic side effects.

In subacute one-month toxicity studies on beagles with oral doses of 50 mg/kg body weight (about 50 times the envisaged maximum human dose), N-furfuryl-4-chloro-5-butoxymethyl)-sulfamoyl)-anthranilic acid was shown to be a most potent diuretic devoid of any toxicity potentials.

The new compounds of formula I are active in their free form as well as in the form of their physiologically acceptable metal salts in oral as well as in parenteral administration. Therefore, they can be used as such or in admixture with suitable pharmaceutically acceptable carriers in solid or liquid form, for example, water, vegetable oils, starch, lactose, talcum or with auxiliary agents, for example, stabilizers, preserving, wetting or emulsifying agents. The products can be compounded in the form of tablets, dragees, capsules, solutions, suspensions or emulsions. With particular advantage the compounds are orally applied in the form of tablets or dragees.

The invention is illustrated by the following Examples without being limited thereto:

EXAMPLE 1

N-Furfuryl-4-chloro-5-(methoxymethyl-sulfamoyl)-anthranilic acid 16.5 g of N-furfuryl-4-chloro-5-sulfamoyl-anthranilic acid and 5 g of sodium bicarbonate were dissolved in a mixture of 33 ml methanol was 7.5 ml of a 37 percent aqueous formaldehyde solution, and the mixture was left at room temperature for 16 hours. The mixture was then filtered, 5 ml of glacial acetic acid were added to the filtrate and the crystals which formed were separated by filtration, washed with methanol and dried. 14.3 g of N-furfuryl-4-chloro-5-(methoxymethyl-sulfamoyl)-anthranilic acid of m.p. 163°–164°C were obtained. Yield 76.4 percent. On TLC the compound was found to be pure and its structure was confirmed by U.V. and NMR spectroscopy, acidimetric titration and elemental analysis which gave the following resuls:

Calculated for : $C_{14}H_{15}ClN_2O_6S$ : C 44.86%; H 4.03%; N 7.48%; S 8.56%; Cl 9.46%; O 25.6%: Found : C 45.4%; H 4.13%; N 7.94%; S 8.32%; CL 9.44%; 25.38%.

In a parallel experiment the same reaction mixture was left at room temperature for 16 hours. The mixture whose pH was about 10 was then filtered and acidified to pH about 1 with 7 ml of concentrated hydrochloric acid. The precipitate thus formed was filtered off, washed with methanol and with chloroform and dried. 11.5 g of N-furfuryl-4-chloro-5-(methoxymethyl-sulfamoyl)-anthranilic acid of m.p. 156°–158°C were obtained after recrystallization the m.p. rose to 162.5°–165°C.

EXAMPLE 2

N-furfuryl-4-chloro-5-methoxymethyl-sulfamoyl)-anthrandilic acid

The same reaction mixture as in Example 1 was heated at reflux temperature for one hour, filtered to remove insoluble material and cooled. 5 ml of glacial acetic acid were added and the crystalline product was isolated as in Example 1. Yield: 12 g of N-furfuryl-4-chloro-5-(methoxymethyl-sulfamoyl)-anthranilic acid m.p. 163°–164.5°C.

EXAMPLE 3

N-Furfuryl-4-chloro-5-(ethoxymethyl-sulfamoyl)-anthranilic acid 16.5 g of N-furfuryl-4-chloro-5-sulfamoyl-anthranilic acid were heated in 33 ml of 95 percent aqueous ethanol containing 2.77 g formaldehyde until complete dissolution. The solution was heated at reflux temperature for one hour, filtered while hot, and allowed to cool down to room temperature at which it was left for 16 hours. The crystals which had precipitated were filtered off and dried. 11.7 g of N-furfuryl-4-chloro-5-(ethoxymethyl-sulfamoyl)-anthranilic acid were obtained, m.p. 132°–134°C. A sample which was recrystallized from ethanol showed a m.p. of 144°–147°C.

Elemental analysis:
Calculated for: $C_{15}H_{17}ClN_2O_6S$: C 46.35%; H 4.38%; N 7.21%: Found : C 46.25%; H 4.32%; N 7.09%.

The U.V. and NMR spectra were in agreement with the assigned structure.

EXAMPLE 4

N-Furfuryl-4-chloro-5-(butoxymethyl-sulfamoyl)-anthranilic acid 16.5 g of N-furfuryl-4-chloro-5-sulfamoyl-anthranilic acid, 7.5 ml of a 37% aqueous formaldehyde solution and 50 ml of butanol were heated on a water bath to 75°–80°C for 3 hours. The hot reaction mixture was filtered and allowed to cool to room temperature at which it was left for 16 hours. The crystals which had precipitated were filtered off, washed with butanol and with methylene chloride and dried. 15.1 g of N-furfuryl-4-chloro-5-(butoxymethyl-sulfamoyl)-anthranilic acid, m.p. 139°–140°C were obtained.

Elemental analysis:
Calculated for: $C_{17}H_{21}ClN_2O_6S$: C 48.98%; H 5.04%; N 6.72%: Found : C 48.96%; H 5.14%; N 6.74%.

The U.V. and NMR spectra were in agreement with the assigned structure.

When the mother liquor was concentrated an additional 2.8 g. of the product were obtained, m.p. 137°–139°C.

EXAMPLE 5

N-Furfuryl-4-chloro-5-(butoxymethyl-sulfamoyl)-anthranilic acid 20 g of N-furfuryl-4-chloro-5-(methoxymethyl-sulfamoyl)-anthranilic acid were dissolved in 60 ml of butanol and the solution was heated at 75°–80°C for 3 hours. The solution was then cooled and left at room temperature for 16 hours. The crystals which had crystallized were filtered off, washed with methylene chloride and dried. 19 g of N-furfuryl-4-chloro-5-(butoxymethyl-sulfamoyl)-anthranilic acid, m.p. 142°–145°C were obtained.

EXAMPLE 6

N-Furfuryl-4-chloro-5-(allyloxymethyl-sulfamoyl)-anthranilic acid.

20 g of N-furfuryl-4-chloro-5-(methoxymethyl-sulfamoyl)-anthranilic acid were dissolved in 60 ml of allyl alcohol and the solution was heated at 80°C for one hour. The solution was then cooled and left at room temperature for 16 hours. The cyrstalline precipitate was filtered off, washed with allyl alcohol and with chloroform and dried. 15.3 g of N-furfuryl-4-chloro-5-allyloxymethyl-sulfamoyl)-anthranilic acid, m.p. 136°–138.5°C were obtained.

Elemental analysis:
Calculated for: $C_{16}H_{17}ClN_2O_6S$ : N 6.99%; Cl 8.85%; S 8.00%: Found: N 6.91%; Cl 9.02%; S 7.99%.

EXAMPLE 7

N-Furfuryl-4-chloro-5-(propargoxymethyl-sulfamyl)-anthranilic acid.

20 g of N-furfuryl-4-chloro-5-(methoxymethyl-sulfamoyl)-anthranilic acid were dissolved at 80°C in 220 ml of propargyl alcohol, and kept for one more hour at this temperature. The solution was then cooled and left at room temperature for 16 hours. The crystalline precipitate was filtered off, washed with propargyl alcohol and with chloroform and dried. 21.9 g of N-furfuryl-4-chloro-5-(propargoxymethyl-sulfamoyl)-anthranilic acid, m.p. 161°–162°C were obtained. After recrystallization the melting point rose to 172°–174°C.
Elemental analysis:
Calculated for: $C_{16}H_{15}ClN_2O_6S$ : N 7.03%; Cl 8.89%; S 8.045; Found: N 7.04%; Cl 9.25%; 7.93%.

EXAMPLE 8

N-Furfuryl-4-chloro-5-(benzyloxymethyl-sulfamoyl)-anthranilic acid.

10 g of N-furfuryl-4-chloro-5-(methoxymethyl-sulfamoyl)-anthranilic acid were dissolved at 80°C in 30 ml of benzyl alcohol, and kept for one more hour at this temperature. The solution was then cooled and left at room temperature for 16 hours. The crystals which had precipitated were filtered off, washed with benzyl alcohol and with chloroform and dried. 11.2 g of N-furfuryl-4-chloro-5-(benzyloxymethyl-sulfamoyl)-anthranilic acid, m.p. 133°–134°C were obtained. After recrystallization the melting point rose to 134°–136°C.
Elemental analysis:
Calculated for: $C_{20}H_{19}ClN_2O_6S$ : N 6.22%; Cl 7.86%; S 7.11%: Found : N 6.21%; Cl 8.1%; S 6.99%.

EXAMPLE 9

N-Furfuryl-4-chloro-5-(furfuryloxymethyl-sulfamoyl)-anthranilic acid 20 g of N-furfuryl-4-chloro-5-(methoxymethyl-sulfamoyl)-anthranilic acid were dissolved at 80°C in 60 ml of furfuryl alcohol, and kept for one more hour at this temperature. The solution was then cooled and left at room temperature for 16 hours. The crysals which had precipitated were filtered off, washed with furfuryl alcohol and with chloroform and dried. 11 g of N-furfuryl-4-chloro-5-(furfuryloxymethyl-sulfamoyl)-anthranilic acid, m.p. 141°–143°C were obtained. After recrystallization the melting point rose to 145°–146°C.
Elemental analysis:
Calculated for: $C_{18}H_{17}ClN_2O_7S$ : N 6.36%; Cl 8.04%; S- 7.27%: Found : N 6.38%; Cl 7.96%; S 7.34%.

EXAMPLE 10

N-Cyclohexyl-4-chloro-5-(methoxymethyl-sulfamoyl)-anthranilic acid 3.3 g of N-cyclohexyl-4-chloro-5-sulfamoyl-anthranilic acid, 1.5 ml of a 36% aqueous formaldehyde solution. 7 ml of methanol and 1.0 g of sodium bicarbonate were heated at reflux temperature for 1 hour. The reaction mixture was then cooled and acidified for 1 hour. The reaction mixture was then cooled and acidified to pH 1 with 10 percent aqueous hydrochloric acid. The precipitate was filtered off, washed with methanol and dried. 1.7 g of N-cyclohexyl-4-chloro-5-(methoxymethyl-sulfamoyl)-anthranilic acid were obtained, which after recrystallization from methanol showed m.p. 170°C (dec.).

EXAMPLE 11

N-Furfuryl-4-chloro-5-(methoxymethyl-sulfamoyl)-anthranilic acid sodium salt 16.5 g of N-furfuryl-4-chloro-5-sulfamoyl-anthranilic acid and 5 g of sodium bicarbonate were dissolved in a mixture of 33 ml methanol and 7.5 ml of a 37 percent aqueous formaldehyde solution, and the mixture was left at room temperature for 16 hours. The solution was filtered and the filtrate was diluted with diethyl ether. The precipitate was suctioned off, washed with ether and dried. 11.2 g of N-furfuryl-4-chloro-5-(methoxymethyl-sulfamoyl)-anthranilic acid sodium salt were obtained.

EXAMPLE 12

N-Furfuryl-4-chloro-5-(methoxymethyl-sulfamoyl)-anthranilic acid 5 g of N-furfuryl-4-chloro- 5-(butoxymethyl-sulfamoyl)-anthranlic acid and 15 ml of methanol were heated at reflux temperature for half an hour, by which time a clear solution was obtained. Heating was continued for a further ¼hour when a precipitate started to appear in the reaction mixture, and for 3½ more hours. The reaction mixture was cooled and filtered, and the crystals thus obtained were washed with methanol and with methylene chloride. 3.4 g of N-furfuryl-4-chloro-5-(methoxymethyl-sulfamoyl)-anthranilic acid m.p. 155°–160°C were obtained.

EXAMPLE 13

N-Furfuryl-4-chloro-5-(pentoxymethyl-sulfamoyl)-anthranilic acid 20 g of N-furfuryl-4-chloro-5-(methoxymethyl-sulfamoyl)-anthranilic acid were dissolved in 60 ml of pentanol and the solution was heated at 80°–90°C for 3 hours. The solution was then cooled and left at room temperature for 24 hours. The crystals were filtered off, washed with methylene chloride and dried at 50°C. 15 g of N-furfuryl-4-chloro-5-(pentoxymethyl-sulfamoyl)-anthranilic acid m.p. 136°–137°C were obtained.
Elemental analysis:
Calculated for: $C_{18}H_{23}ClN_2O_6S$ N 6.50%; Cl 8.23%; S 7.44%: Found : N 6.48%; Cl 8.00%; S 7.5%.

EXAMPLE 14

N-Furfuryl-4-chloro-5-(hexoxymethyl-sulfamoyl)-anthranilic acid 20 g of N-furfuryl-4-chloro-5-(methoxy methyl-sulfamoyl)-anthranilic acid were dissolved in 60 ml of hexanol and heated at reflux temperature for 2 hours. The solution was then cooled and left at room temperature for 16 hours. The crystalline precipitate was filtered off, washed with hexanol and with chloroform and dried at 50°C. N-furfuryl-4-chloro-5-(hexoxymethyl-sulfamoyl)-anthranilic acid m.p. 112°–114°C were obtained. After recrystallization the melting point rose to 116°–117°C.
Elemental analysis:
Calculated for: $C_{19}H_{25}ClN_2O_6S$ N 6.29%; Cl 7.96%; S 7.20%: Found : N 6.1%; Cl 8.0%; S 7.2%.

EXAMPLE 15

N-Furfuryl-4-chloro-5-(heptoxymethyl-sulfamoyl)-anthranilic acid 20 g

N-furfuryl-4-chloro-5-(methoxymethyl-sulfamoyl)-anthranilic acid were dissolved in 60 ml of heptanol and heated at reflux temperature for 2 hours. The solution was then cooled and left at room temperature for 16 hours. The crystalline precipitate was filtered off, washed with heptanol and with methylene chloride and dried.

N-furfuryl-4-chloro-5-(heptoxymethyl-sulfamoyl)-anthranilic acid, m.p. 131°–133°C were obtained. After recrystallization from aqueous isopropanol the melting point rose to 133°–135°C.

Elemental analysis:
Calculated for: $C_{20}H_{27}ClN_2O_6S$: N 6.10%; Cl 7.72%; S 6.98%: Found : N 6.1%; Cl 7.56%; S 7.2%.

EXAMPLE 16

N-(n-Butyl)-4-chloro-5-(methoxymethyl-sulfamoyl)-anthranilic acid 24.5 g of N-(n-Butyl)-4-chloro-5-sulfamoyl-anthranilic acid, 80 g of sodium bicarbonate, 60 ml of methanol and 120 ml of 37 percent aqueous formaldehyde solution were heated at reflux temperature for 1 hour. The reaction mixture was filtered hot and acidified with 8 ml of acetic acid. The precipitate was stirred at room temperature for 3 hours, filtered off, washed with methanol and dried. 22.7 g of N-(n-butyl)-4-chloro-5-(methoxymethyl-sulfamoyl)-anthranilic acid were obtained; m.p. 167°–169°C after recrystallization from methanol-dioxane (1:1). Assay 99.5 percent.

EXAMPLE 17

N-Cyclohexyl-4-chloro-5-(n-butoxymethyl-sulfamoyl)-anthranilic acid 10 g of N-Cyclohexyl-4-chloro-5-(methoxymethyl-sulfamoyl)-anthranilic acid were dissolved in 30 ml of n-butanol at 75°C, and the solution maintained at 80°–90°C for 1 hour. The solution was then cooled to 40°C, 30 ml of petrol ether were added and the mixture was stirred for 3 hours at room temperature. The crystals formed were filtered off, washed with petrol ether and dried at 50°C. Yield 5.5 g of N-Cyclohexyl-4-chloro-5-(n-butoxymethyl-sulfamoyl)-anthranilic acid; m.p. 143°–145°C. Assay 99.2 percent.

EXAMPLE 18

N-Benzyl-4-chloro-5-(methoxymethyl-sulfamoyl)-anthranilic acid 23.8 g of N-Benzyl-4-chloro-5-sulfamoyl-anthranilic acid, 7.0 g of sodium carbonate, 50 ml of methanol and 11 ml of 37% aqueous formaldehyde solution were heated at reflux temperature for 1 hour. The reaction mixture was filtered hot and acidified with 7 ml of acetic acid. The precipitate was stirred at room temperature for 3 hours, filtered off, washed with methanol and dried. 15.6 g of N-benzyl-4-chloro-5-(methoxymethyl-sulfamoyl)-anthranilic acid were obtained; m.p. 164°–165°C (dec) after recrystallization from methanol and dioxane (2:1). Assay 98.4 percent

EXAMPLE 19

N-furfuryl-4-chloro-5-(isopropoxymethyl-sulfamoyl)-anthranilic acid 16.5 g of N-furfuryl-4-chloro-5-sulfamoyl-anthranilic acid in 33 ml isopropanol containing 5 ml of a 37 percent aqueous formaldehyde solution were refluxed until a clear solution was obtained. The solution was refluxed for a further hour, cooled to room temperature and left overnight for recrystallization. The next day the crystals were filtered off, washed with isopropanol and dried at 50°C. Yield 7.9 g melting at 123°–125°C. The product crystallizes with half a mole of isopropanol. Assay 100 percent. TLC: a single spot.

EXAMPLE 20

N-Furfuryl-4-chloro-5-(ethylthiomethyl-sulfamoyl)-anthranilic acid 16.5 g of N-furfuryl-4-chloro-5-sulfamoyl-anthranilic acid, 10 ml of a 37 percent aqueous formaldehyde solution, 10 ml of ethanethiol (ethylmercaptan), 5 g of sodium bicarbonate and 40 ml of methanol were heated in a water bath with stirring until dissolution was complete and then for one more hour. The reaction mixture was filtered, and 80 ml of water and 5 ml of glacial acetic acid were added to the cooled filtrate. The crystals which formed were separated by filtration, and washed with isopropanol, water and again with isopropanol. The product was recrystallized from isopropanol and dried. 13.6 g of N-furfuryl-4-chloro-5-(ethylthiomethyl-sulfamoyl)-anthranilic acid of m.p. 166°–168°C were obtained. The melting point did not change after a further recrystallization from n-butanol. The product was found to be pure on TLC and its UV and NMR spectra confirmed its structure.
Elemental analysis:
Calculated for: $C_{15}H_{17}ClN_2O_5S_2$: C 44.49%; H 4.23%; N 6.91%; Cl 8.75%; S 15.8%: Found : C 44.65%; H 4.36%; N 6.88%; Cl 8.7%; S 15.8%.

EXAMPLE 21

N-Furfuryl-4chloro-5-(n-propylthiomethyl-sulfamoyl)-anthranilic acid

When in the procedure of Example 20 the ethanethiol was replaced by an equal amount of n-propanethiol, 8.8 g of the title compound, m.p. 158°–159°C was obtained.
Elemental analysis:
Calculated for: $C_{16}H_{19}ClN_2O_5S_2$: C 45.87%; H 4.57%; N 6.68%; Cl 8.47%; S 15.27%: Found : C 45.74%; H 4.52%; N 6.72%; Cl 8.3%; S 15.1%.

EXAMPLE 22

N-Furfuryl-4-chloro-5-(isopropylthiomethyl-sulfamoyl)-anthranilic acid

When in the procedure of Example 20 the ethanethiol was replaced by an equal amount of isopropanethiol, 9.1 g of the title compound, m.p. 164°–166°C was obtained.
Elemental analysis:
Calculated for $C_{16}H_{19}ClN_2O_5S_2$: C 45.87%; H 4.57%; N 6.68%; Cl 8.47%; S 15.27%: Found : C 45.70%; H 4.63%; N 6.67%; Cl 8.35%; S 15.1%.

EXAMPLE 23

N-Furfuryl-4-chloro-5-(β-hydroxyethylthiomethyl-sulfamoyl)-anthranilic acid

When in the procedure of Example 20 the ethanethiol was replaced by an equal amount of β-mercaptoethanol, 17.6 g of the title compound, m.p. 149°–150°C, was obtained.
Elemental analysis:
Calculated for: $C_{15}H_{17}ClN_2O_6S_2$: C 42.77%; H 4.07%; N 6.66%; Cl 8.42%; S 15.23%: Found : C 42.93%; H 4.17%; N 6.63%; Cl 8.37%; S 15.2%.

EXAMPLE 24

N-Furfuryl-4-chloro-5-(2,3-dihydroxypropylthiomethyl-sulfamoyl)-anthranilic acid When in the procedure of Example 20 the ethanethiol was replaced by an equal amount of α-thioglycerine, 16 g of the title compound, m.p. 138°–140°C was obtained.
Elemental analysis:

Calculated for: $C_{16}H_{20}ClN_2O_7S_2$: C 42.62%; H 4.25%; N 6.20%; Cl 7.87%; S 14.19%: Found : C 42.35%; H 4.55%; N 6.3%; Cl 7.81%; S 14.2%.

EXAMPLE 25

N-Furfuryl-4-chloro-5-(benzylthiomethyl-sulfamoyl)-anthranilic acid

When in the procedure of Example 20 the ethanethiol was replaced by an equal amount of benzylthiol, 14.8 g of the title compound, m.p. 160°C was obtained. Elemental analysis:

Calculated for: $C_{20}H_{20}ClN_2O_5S_2$: C 51.33%; H 4.31%; N 5.99%; Cl 7.57%; S 13.70%: Found : C 51.36%; H 4.19%; N 5.95%; Cl 7.4%; S 13.6%.

EXAMPLE 26

N-Furfuryl-4-chloro-5-($\beta$-hydroxyethylthiomethyl-sulfamoyl)-anthranilic acid 20 g of N-furfuryl-4-chloro-5-(methoxymethyl-sulfamoyl)-anthranilic acid was suspended in 60 ml of $\beta$-mercaptoethanol and the suspension was heated under stirring in a water bath at 80°–90°C until dissolution was complete and for 2 more hours. The clear solution was diluted with 60 ml of water and left at room temperature for 16 hours. The crystalline precipitate was separated by filtration, washed with isopropanol and dried. 15.6 g of N-furfuryl-4-chloro-5-($\beta$-hydroxyethylthiomethyl-sulfamoyl)-anthranilic acid, m.p. 147°–149°C was obtained. The melting point was not depressed when a sample was admixed with the product obtained in Example 23. The N-furfuryl-4-chloro-5-(methoxymethyl-sulfamoyl)-anthranilic acid used as starting material was prepared in accordance with Example 1.

EXAMPLE 27

N-Furfuryl-4-chloro-5-(2,3-dihydroxypropylthiomethyl-sulfamoyl)-anthranilic acid When in the procedure of Example 26 $\beta$-mercaptoethanol was replaced by an equal amount of $\alpha$-thioglycerine, 18.1 g of the title compound, m.p. 138°–140°C was obtained. The melting point was not depressed when a sample was admixed with the product obtained in Example 24.

EXAMPLE 28

N-Furfuryl-4-chloro-5-($\beta$ethoxy-ethoxymethyl-sulfamoyl)-anthranilic acid 20 g of N-furfuryl-4-chloro-5-(methoxymethyl-sulfamoyl)-anthranilic acid was dissolved at 80°C in 30 ml of 2-ethoxy-ethanol (cellosolve) and kept for three more hours at this temperature. The solution was then concentrated to one-half of the initial volume, cooled and left at room temperature for 16 hours. The crystalline precipitate was filtered off, washed with 2-ethoxyethanol: benzene 1:9, and dried. 9.4 g of N-furfuryl-4-chloro-5-($\beta$-ethoxy-ethoxymethyl-sulfamoyl)-anthranilic acid was obtained, m.p. 104°–107°C. Elemental analysis:

Calculated for: $C_{17}H_{21}ClN_2O_7S$: S 7.40%; N 6.4%; Cl 8.19%: Found : S 7.38%; N 6.3%; Cl 8.3%.

EXAMPLE 29

N-Furfuryl-4-chloro-5-(cyclohexoxy-methyl-sulfamoyl)-anthranilic acid 20 g of N-furfuryl-4-chloro-5-(methoxy-methyl-sulfamoyl)-anthranilic acid was dissolved at 80°C in 40 of cyclohexanol and kept for three more hours at this temperature. The solution was then cooled and left at room temperature for 16 hours. The crystalline precipitate was filtered off, washed with cyclohexanol: benzene 1:9 and dried. 6 g of N-furfuryl-4-chloro-5-(cyclohexoxy-methyl-sulfamoyl)-anthranilic acid was obtained, m.p. 137°–140°C.
Elemental analysis:

Calculated for: $C_{19}H_{23}ClN_2S$: S 7.23%; N 6.32%; Cl 8.00%: Found : S 7.20%; N 6.3%; Cl 8.10%.

EXAMPLE 30

100 g of N-Furfuryl-4-chloro-5-(butoxymethyl-sulfamoyl)-anthranilic acid was thoroughly mixed with 800 g of lactose B.P., the mixture was finely ground to mesh 20 and sieved. The mixture was filled into capsules containing each 25 mg and 50 mg of active material.

We claim:

1. A compound of the formula

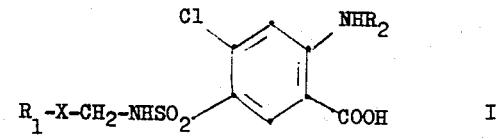

in which X is oxygen or sulfur, $R_1$ is a member selected from the group consisting of straight and branched-chain lower alkyl radicals of up to 10 carbon atoms optionally substituted by hydroxy and lower alkoxy, cyclohexyl radical, allyl radical, propargyl radical, benzyl radical and furfuryl radical, and $R_2$ is a member of the group consisting of straight and branched-chain alkyl radicals having up to 4 carbon atoms, benzyl, furfuryl, thenyl, pyrrolyethyl and cyclohexyl radicals, or physiologically acceptable salt thereof.

2. A compound according to claim 1, having the general formula

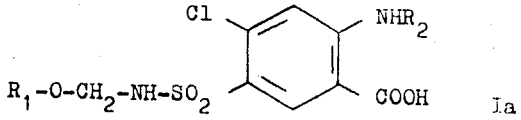

wherein $R_1$ and $R_2$ have the same meanings as in claim 1.

3. A compound according to claim 1, having the general formula

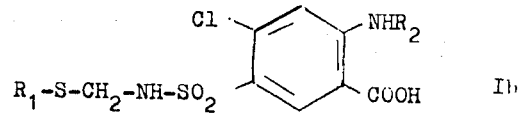

wherein $R_1$ and $R_2$ have the same meanings as in claim 1.

4. N-Furfuryl-4-chloro-5-(methoxymethyl-sulfamoyl)-anthranilic acid, and physiologically acceptable salts thereof according to claim 2.

5. N-Furfuryl-4-chloro-5-(ethoxymethyl-sulfamoyl)-anthranilic acid, and physiologically acceptable salts thereof according to claim 2.

6. N-Furfuryl-4-chloro-5-(butoxymethyl-sulfamoyl)-anthranilic acid, and physiologically acceptable salts thereof according to claim 2.

7. N-Furfuryl-4-chloro-5-(allyloxymethyl-sulfamoyl)-anthranilic acid, and physiologically acceptable salts thereof according to claim 2.

8. N-Furfuryl-4-chloro-5-(propargyloxymethyl-sulfamoyl)-anthranilic acid, and physiologically acceptable salts thereof according to claim 2.

9. N-Furfuryl-4-chloro-5-(benzyloxymethyl-sulfamoyl)-anthranilic acid, and physiologically acceptable salts thereof according to claim 2.

10. N-Furfuryl-4-chloro-5-(furfuryloxymethyl-sulfamoyl)-anthranilic acid, and physiologically acceptable salts thereof according to claim 2.

11. N-Cyclohexyl-4-chloro-5-(methoxymethyl-sulfamoyl)-anthranilic acid, and physiologically acceptable salts thereof according to claim 2.

12. N-Furfuryl-4-chloro-5-(pentoxymethyl-sulfamoyl)-anthranilic acid, and physiologically acceptable salts thereof according to claim 2.

13. N-Furfuryl-4-chloro-5-(hexoxymethyl-sulfamoyl)-anthranilic acid and physiologically acceptable salts thereof according to claim 2.

14. N-Furfuryl-4-chloro-5-(heptoxymethyl-sulfamoyl)-anthranilic acid, and physiologically acceptable salts thereof according to claim 2.

15. N(n-Butyl)-4-chloro-5-(methoxymethyl-sulfamoyl)-anthranilic acid, and physiologically acceptable salts thereof according to claim 2.

16. N-Cyclohexyl-4-chloro-5-(n-butoxymethyl-sulfamoyl)-anthranilic acid, and physiologically acceptable salts thereof according to claim 2.

17. N-Benzyl-4-chloro-5-(methoxymethyl-sulfamoyl)-anthranilic acid, and physiologically acceptable salts thereof according to claim 2.

18. N-Furfuryl-4-chloro-5-(isopropoxymethyl-sulfamoyl)-anthranilic acid, and physiologically acceptable salts thereof according to claim 2.

19. N-Furfuryl-4-chloro-5-($\beta$-ethoxy-ethoxymethylsulfamoyl)-anthranilic acid, and physiologically acceptable salts thereof according to claim 2.

20. N-Furfuryl-4-chloro-5-(cyclohexoxy-methyl-sulfamoyl)-anthranilic acid, and physiologically acceptable salts thereof according to claim 2.

21. N-Furfuryl-4-chloro-5-(ethylthiomethyl-sulfamoyl)-anthranilic acid, and physiologically acceptable salts thereof according to claim 3.

22. N-Furfuryl-4-chloro-5-(n-propylthiomethyl-sulfamoyl)-anthranilic acid, and physiologically acceptable salts thereof according to claim 3.

23. N-Furfuryl-4-chloro-5-(isopropylthiomethyl-sulfamoyl)-anthranilic acid, and physiologically acceptable salts thereof according to claim 3.

24. N-Furfuryl-4-chloro-5-($\beta$-hydroxyethylthiomethyl-sulfamoyl)-anthranilic acid, and physiologically acceptable salts thereof according to claim 3.

25. N-Furfuryl-4-chloro-5-(2,3-dihydroxypropylthiomethyl-sulfamoyl)-anthranilic acid, and physiologically acceptable salts thereof according to claim 3.

26. N-Furfuryl-4-chloro-5-(benzylthiomethyl-sulfamoyl)-anthranilic acid, and physiologically acceptable salts thereof according to claim 3.

* * * * *